US012028945B2

(12) United States Patent
Archer et al.

(10) Patent No.: US 12,028,945 B2
(45) Date of Patent: Jul. 2, 2024

(54) SYSTEM AND METHOD FOR DRIVING LIGHTS WITH A DIM-STOP LIMIT

(71) Applicant: ERP POWER, LLC, Moorpark, CA (US)

(72) Inventors: Michael Archer, Moorpark, CA (US); Steven C. Krattiger, Northridge, CA (US); Louis Chen, Simi Valley, CA (US); James H. Mohan, Valencia, CA (US); Yuko Nakazawa, Santa Cruz, CA (US)

(73) Assignee: ERP POWER, LLC, Westlake Village, CA (US)

( * ) Notice: Subject to any disclaimer, the term of this patent is extended or adjusted under 35 U.S.C. 154(b) by 39 days.

(21) Appl. No.: 17/902,336

(22) Filed: Sep. 2, 2022

(65) Prior Publication Data

US 2023/0083227 A1 Mar. 16, 2023

Related U.S. Application Data

(60) Provisional application No. 63/242,921, filed on Sep. 10, 2021.

(51) Int. Cl.
*H05B 45/28* (2020.01)

(52) U.S. Cl.
CPC .................................... *H05B 45/28* (2020.01)

(58) Field of Classification Search
CPC ...................................................... H05B 45/28
See application file for complete search history.

(56) References Cited

U.S. PATENT DOCUMENTS

| | | | | |
|---|---|---|---|---|
| 8,928,249 B2 | 1/2015 | Raj et al. | | |
| 2009/0079358 A1* | 3/2009 | Shteynberg | ............ | H05B 45/24 315/291 |

* cited by examiner

*Primary Examiner* — Henry Luong
(74) *Attorney, Agent, or Firm* — Lewis Roca Rothgerber Christie LLP

(57) ABSTRACT

A programmable lighting system includes a plurality of color channels configured to generate light of different colors, and a light driver configured to drive the plurality of color channels according to a dimmer setting and a correlated color temperature (CCT) setting, and to maintain a constant maximum lumen output across a range of CCT values based on a dim-stop limit.

16 Claims, 6 Drawing Sheets

SYSTEM AND METHOD FOR DRIVING LIGHTS WITH A DIM-STOP LIMIT

CROSS-REFERENCE TO RELATED APPLICATION(S)

This application claims priority to and the benefit of U.S. Provisional Patent Application No. 63/242,921, filed in the United States Patent and Trademark Office on Sep. 10, 2021, the entire disclosure of which is incorporated by reference herein.

FIELD

Aspects of the present invention are related to lighting systems.

BACKGROUND

A light emitting diode (LED) is an electronic device that converts electrical energy (commonly in the form of electrical current) into light. The light intensity of an LED is primarily based on the magnitude of the driving current. An LED light source may simulate warm colors by optically mixing light from white LEDs with other color LEDs, such as amber LEDs, and controlling their drive currents such that the light combination changes from a white color light to a more yellowish/orangish white light.

However, LED drivers with CCT adjustment capabilities generally do not limit the lumen output for a range of CCT. Therefore, such drivers may suffer from inconsistent lumen output at the maximum and minimum of the CCT dimming range. Therefore, as the user adjusts the CCT the light output of the driver may change in a way that is very noticeable to an observer, which is undesirable.

The above information disclosed in this Background section is only for enhancement of understanding of the invention, and therefore it may contain information that does not form the prior art that is already known to a person of ordinary skill in the art.

SUMMARY

Aspects of some embodiments of the present disclosure are directed to a lighting system including a programmable LED driver configured to produce light of a desired correlated color temperature (CCT) and/or dimming level, which is also capable of providing consistent light output across a range of CCT values. In some embodiments, the LED driver allows a user to activate/deactivate the dim stop feature and to select between specified dim-stop limits to set the LED driver to a desired limit. According to some embodiments, light dimming (e.g., 0-10V dimming) is preserved after activating dim-stop, and the dimmer may dim between the selected dim-stop limit and a minimum light output. The LED driver may have CCT and light output dimmer inputs, which may be programmed by one or more programming signals from an external programming device.

According to some embodiments of the present disclosure, there is provided a programmable lighting system including: a plurality of color channels configured to generate light of different colors; and a light driver configured to drive the plurality of color channels according to a dimmer setting and a correlated color temperature (CCT) setting, and to maintain a constant maximum lumen output across a range of CCT values based on a dim-stop limit.

In some embodiments, the light driver is configured to adjust channel currents to the plurality of color channels to limit a lumen output of the plurality of color channels to the dim-stop limit.

In some embodiments, the light driver includes: a first current control circuit coupled to a first color channel of the plurality of color channels and configured to adjust a first channel current driving the first color channel based on a first calibrated reference signal; and a channel controller configured to generate the first calibrated reference signal based on the dimmer setting, the CCT setting, and the dim-stop limit.

In some embodiments, the channel controller is further configured to perform: generating a first reference signal for driving the first color channel according to the dimmer setting and the CCT setting; determining a first calibration value based on the dim-stop limit and the CCT setting; and calculating the first calibrated reference signal by multiplying the first reference signal by the first calibration value.

In some embodiments, determining the first calibration value includes: determining a maximum lumen output of the light driver at the CCT setting; and calculating the first calibration value by dividing the dim-stop limit by the maximum lumen output.

In some embodiments, determining the maximum lumen output of the light driver is based on a look-up table (LUT) associating CCT values with maximum lumen outputs of the light driver.

In some embodiments, the first current control circuit includes: a current sensor configured to sense the first channel current of the first color channel and to generate a first sense signal; an error amplifier configured to receive the first sense signal and the first calibrated reference signal, and to generate a gate control signal based on a difference between the first calibrated reference signal and the first sense signal; and a voltage-controlled resistor (VCR) configured to adjust the first channel current by dynamically adjusting a resistance of the VCR based on the gate control signal.

In some embodiments, the current sensor includes: a sense resistor electrically coupled in series with the VCR and the first color channel; and a current sense circuit configured to generate the first sense signal based on a voltage drop across the sense resistor.

In some embodiments, the programmable lighting system further includes: a second current control circuit coupled to a second color channel of the plurality of color channels and configured to adjust a second channel current driving the second color channel based on a second calibrated reference signal; and a third current control circuit coupled to a third color channel of the plurality of color channels and configured to adjust a third channel current driving the third color channel based on a third calibrated reference signal, wherein the channel controller is further configured to generate the second and third calibrated reference signals based on the dimmer setting, the CCT setting, and the dim-stop limit.

In some embodiments, the light driver further includes: a power supply circuit configured to generate a drive signal for powering the plurality of color channels based on an input power signal, wherein the first current control circuit is configured to adjust the first channel current of the first color channel further based on the drive signal.

In some embodiments, the power supply circuit includes: a voltage regulator; and a transformer having a primary winding coupled to the voltage regulator and a secondary winding electrically isolated from the primary winding and coupled to the first current control circuit.

In some embodiments, the light driver includes: a rectifier circuit configured to rectify the input power signal to generate a rectified signal having a single polarity, wherein the power supply circuit is configured to generate the drive signal based on the rectified signal.

In some embodiments, the plurality of color channels includes: a first color channel including one or more green LEDs; a second color channel including one or more blue LEDs; and a third color channel including one or more red LEDs.

In some embodiments, the dim-stop limit corresponds to a lumen output of the plurality of color channels at a minimum CCT value or a maximum CCT value of the range of CCT values.

In some embodiments, the light driver is configured to be programmed with the dim-stop limit from a programming device, and the light driver is configured to receive the dimmer setting from a dimmer device.

According to some embodiments of the present disclosure, there is provided a method of driving a plurality of color channels, the method including: receiving, by a light driver, a dimmer setting, a correlated color temperature (CCT) setting, and a dim-stop limit; and driving, by the light driver, the plurality of color channels according to the dimmer setting and the CCT setting to maintain a constant maximum lumen output across a range of CCT values based on the dim-stop limit.

In some embodiments, driving the plurality of color channels includes: generating a first calibrated reference signal based on the dimmer setting, the CCT setting, and the dim-stop limit; and adjusting a first channel current driving a first color channel of the plurality of color channels based on the first calibrated reference signal.

In some embodiments, generating the first calibrated reference signal includes: generating a first reference signal for driving the first color channel according to the dimmer setting and the CCT setting; determining a first calibration value based on the dim-stop limit and the CCT setting; and calculating the first calibrated reference signal by multiplying the first reference signal by the first calibration value.

In some embodiments, determining the first calibration value includes: determining a maximum lumen output of the light driver at the CCT setting; and calculating the first calibration value by dividing the dim-stop limit by the maximum lumen output.

In some embodiments, the determining the maximum lumen output of the light driver is based on a look-up table (LUT) associating CCT values with maximum lumen outputs of the light driver.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

The detailed description set forth below is intended as a description of example embodiments of present disclosure, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Aspects of some embodiments of the present disclosure are directed to an LED driver that is capable of artificially limiting the lumen output that the driver can deliver, thereby producing a consistent (e.g., constant) lumen output across a wide range of CCT values. In some embodiments, this may be achieved by obtaining scaling data from a series of calibrations. As a result, the light produced by the LED channels are mixed to achieve the desired CCT while collectively producing light that is at the lumen limit that the driver is set to. This lumen limit may be set at a predetermined level and emitted light is achieved by performing color mixing of green, red, and blue LED channels. This method of limiting lumen output also prevents noticeable variation in lumen output during a side-by-side comparison of similar light fixtures.

Figure 1:
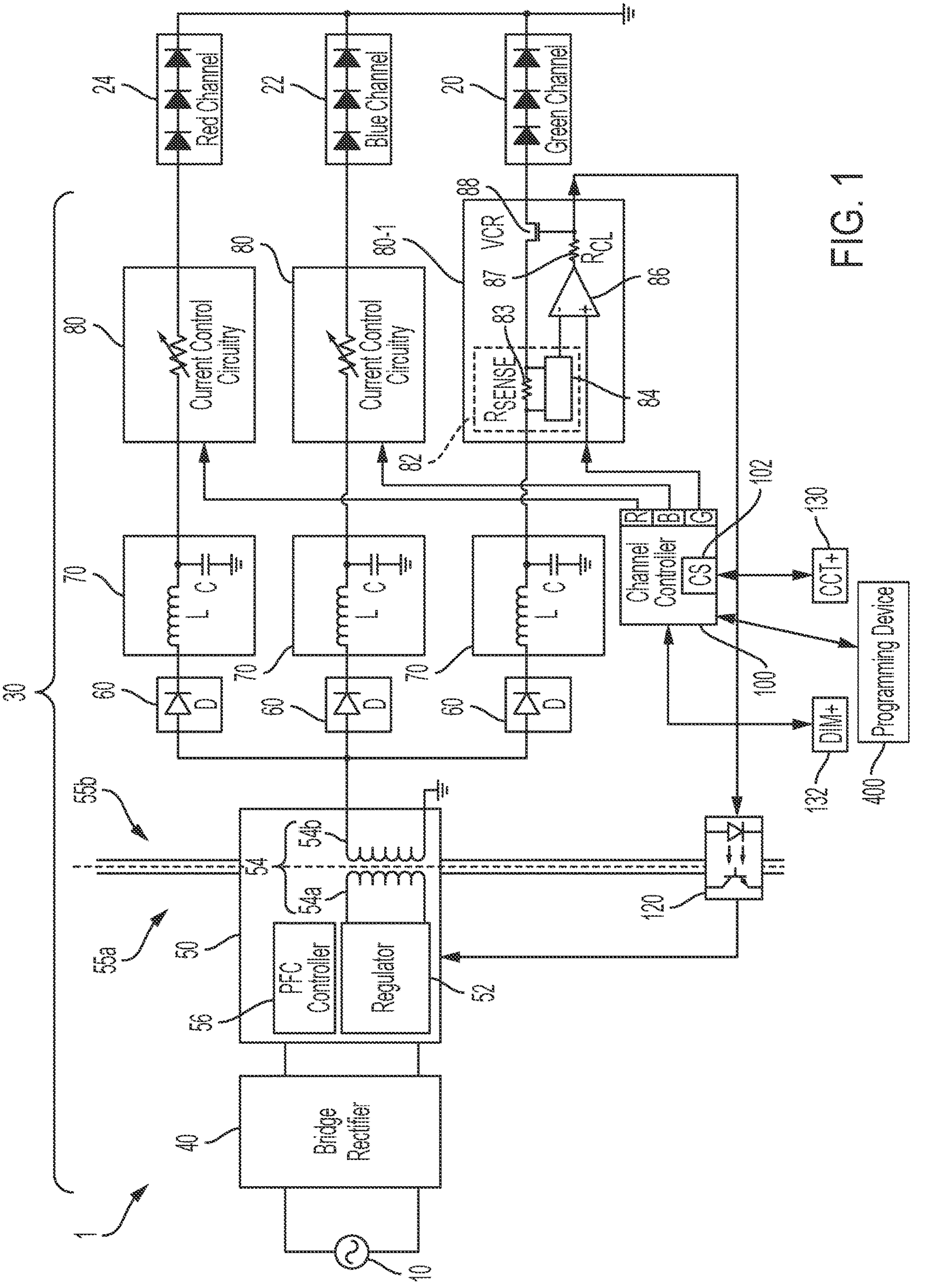
FIG. 1 illustrates a programmable lighting system including a multi-channel light driver, according to some example embodiments of the present disclosure.

FIG. 1 illustrates a programmable lighting system including a multi-channel light driver, according to some example embodiments of the present disclosure.

According to some embodiments, the lighting system 1, which is powered by an input source 10, includes a plurality of color channels (e.g., a plurality of LED channels) 20, 22, and 24, and a programmable multi-channel light driver 30 for powering and controlling the brightness/intensity of the color channels 20, 22, and 24.

The input source 10 may include an alternating current (AC) power source that may operate at a voltage of 100 Vac, a 120 Vac, a 240 Vac, or 277 Vac, for example.

In some embodiments, the plurality of color channels includes a first channel (e.g., a green channel) 20, a second channel (e.g., a blue channel) 22, and a third channel (e.g., a red channel) 24. Each channel may include one or more light-emitting-diodes (LEDs) of the corresponding colors (e.g., red, green, or blue LEDs). While in some embodiments, the first through third color channels 22-24 represent RGB colors, embodiments of the present disclosure are not limited thereto, and the plurality of channels may include any suitable number of color channels. Further, embodiments, of the present disclosure are not limited to LEDs, and in some examples, other solid-state lighting devices may be employed.

In some embodiments, the multi-channel light driver 30 includes a rectifier 40, a power supply circuit 50, a plurality of rectifiers 60, a plurality of filters 70, a plurality of current control circuits 80, and a channel controller 100.

The rectifier 40 may provide the same polarity of output for either polarity of the AC signal from the input source 10. In some examples, the rectifier 40 may be a full-wave circuit using a center-tapped transformer, a full-wave bridge circuit with four diodes, a half-wave bridge circuit, or a multi-phase rectifier.

The power supply circuit 50 converts the rectified AC signal generated by the rectifier 40 into a drive signal for powering the plurality of color channels 20, 22, and 24. In some embodiments, the power supply circuit 50 includes a voltage regulator 52 for maintaining (or attempting to maintain) a constant DC bus voltage on its output while drawing a current that is in phase with and at the same frequency as the line voltage (by virtue of the PFC circuit). A transformer 54 inside the power supply circuit 50 produces the desired output voltage from the DC bus. In some examples, the power supply circuit 50 may include a PFC circuit (or PFC controller) 56 for improving (e.g., increasing) the power factor of the load on the input source 10 and reducing the total harmonic distortions (THD) of the light driver 30. The power supply circuit 50 has a primary side 55*a* and a secondary side 55*b* that is electrically isolated from, and inductively coupled to, the primary side 55*a*. The primary and secondary sides 55*a* and 55*b* may correspond to the primary and secondary windings 54*a* and 54*b* of the transformer 54.

According to some embodiments, the multi-channel light driver 30 drives the plurality of color channels 20, 22, and 24 to produces light temperatures that follow the blackbody curve. In so doing, the multi-channel light driver 30 may perform color mixing of, for example, red, blue, and green light to achieve the desired light temperature.

In some embodiments, the driving current of each of the plurality of color channels 20, 22, and 24 may be derived from the same secondary winding 54*b* of the transformer 54. While the plurality of color channels 20, 22, and 24 are driven by the same winding, the channel current of each color channel is independent of the other color channels. This independent control of the channel currents is enabled by utilizing a separate/different current control circuit 80 for each color channel 20/22/24.

According to some embodiments, each color channel 20/22/24 has a dedicated rectifier (e.g., diode) 60 and filter 70, which convert the AC driving signal output by the secondary winding 54*a* of the transformer 54 into a DC channel current for driving the corresponding color channel 20/22/24. The anodes of the rectifiers 60 may all be connected (e.g., directly connected) to the same output terminal of the power supply circuit 50. Having separate rectifiers 60 for each color channel allows for each channel to be driven by a different voltage. The rectifiers 60 also prevent backflow of current from one color channel 20/22/24 to another, which facilitates the accurate and individual control of channel current.

According to some embodiments, each of the plurality of current control circuits 80 is configured to adjust the channel current of the corresponding color channel 20/22/24 based on the drive signal from the power supply circuit 50 and a corresponding reference signal from the channel controller 100. The channel controller 100 is configured to generate the reference signals for the plurality of current control circuits 80 based on a desired color temperature.

In some embodiments, the current control circuit 80 is electrically coupled to the secondary side 55*b* of the power supply circuit 50 and is electrically isolated from the primary side 55*a*. The current control circuit 80 includes a current sensor 82 configured to sense a channel current ($I_{CHANNEL}$) of the corresponding color channel 20/22/24 and to generate a sense signal; an error amplifier (also referred to as a comparator) 86 configured to receive the sense signal from the current sensor 82 and the reference signal ($V_{REF}$) from the channel controller 100, and to generate the feedback signal (also referred to as an error signal/gate control signal) based on a difference between the reference signal and the sense signal; and a voltage-controlled resistor (VCR, e.g., a linear pass element) 88 that is configured to adjust the corresponding channel current by dynamically adjusting a resistance of the VCR 88 based on the feedback signal from the error amplifier 86.

In some embodiments, the current sensor 82 includes a sense resistor ($R_{SENSE}$) 83 that is coupled between the output of the power supply circuit 50 and the corresponding color channel 20/22/24 and is connected electrically in series with the corresponding color channel 20/22/24. The current sensor 82 also includes a current sense circuit 84 that is configured to sense a current of the color channel 20/22/24 by measuring the voltage drop across the sense resistor 83, and to generate the sense signal that is provided to the error amplifier 86 (e.g., to the negative input terminal of the error amplifier 86).

According to some embodiments, the VCR 88 is electrically connected in series with the sense resistor 83 and the color channel 20/22/24. In some embodiments, the VCR 88 is a field effect transistor (FET), such as a junction FET (JFET) or a metal-oxide-semiconductor FET (MOSFET) that operates in the quasi-saturation region (e.g., linear/ohmic region) and functions as a variable resistor, whose resistance is controlled by the gate voltage.

According to some embodiments, the feedback signal from the error amplifier 86 controls the resistance of the VCR 88 to regulate the channel current to a desired value, which corresponds to the reference signal. As the current control circuits 80 dynamically adjusts the resistance of the VCR 88 in response to the instantaneous changes in the channel current, the current control circuit 80 regulates the channel current to the desired level, as determined by the corresponding reference signal.

According to some embodiments, the channel controller 100 generates a reference signal for each of the plurality of color channels 20, 22, and 24 based on the desired color intensity of the channels. For example, when the color channels include a green color channel 20, a blue color channel 22, and a red color channel 24, the channel controller 100 may generate a first reference signal corresponding to the desired green color intensity to send to the first current control circuit 80 associated with the green color channel 20; may generate a second reference signal corresponding to the desired blue color intensity to send to the second current control circuit 80 associated with the blue color channel 22; and may generate a third reference signal corresponding to the desired red color intensity to send to the third current control circuit 80 associated with the red color channel 24. By controlling the color intensity (as measured by lumens, Lm) of each of the red, blue, and green colors output by the color channels 20, 22, and 24, the channel controller 100 may not only enable light dimming, but also adjusts the color mixing of the channels 20, 22, and 24 to replicate light temperatures (temperature in kelvins, K), which follow the black body curve.

The channel controller 100 determines the color mix (e.g., the intensity of the red, blue, and green light colors) for each color temperature based on a first look-up table that provides the light intensities of the different color channels. The tabulated color mix may accurately follow the black body curve.

In some embodiments, the power supply circuit 50-1 monitors the state of the VCR 88 of the current control circuit 80-1 and adjusts its output voltage (i.e., the output voltage of the secondary winding 54*b*) to reduce or minimize the voltage drop across the VCRs 88. In some examples, current control circuit 80-1 corresponds to (e.g., is associated with) the green color channel 20.

In some examples, the feedback signal (also referred to as a correction signal) from the error amplifier 86 that controls the green color channel 20 is communicated through the primary-secondary barrier of the power supply circuit 50 via an optocoupler 120, which enables communication between the primary and secondary sides 55*a* and 55*b* while maintaining the electrical isolation between the two sides. In some embodiments, the feedback signal is provided to the PFC circuit 56, which may perform power factor correction for the power supply circuit 50. While the embodiments illustrated in FIG. 1 show a feedback signal from a channel controller to the power supply circuit 50, embodiments of the present disclosure are not limited thereto. For example, the light driver 30 may not utilize such a feedback signal and the optocoupler 120.

In some embodiments, when the error amplifier 86 of the current control circuit 80-1 determines to increase the drive current of the green color channel 20 (e.g., when increasing the intensity of the green light), the corresponding feedback signal, which is transmitted to the primary side 55*a*, notifies the power supply circuit 50 to increase its output voltage to ensure sufficient drive voltage for the green color channel 20 (and hence the blue and red color channels 22 and 24). Conversely, when the error amplifier 86 of the current control circuit 80-1 determines to decrease the drive current of the green color channel 20 (e.g., when reducing the intensity of the green light), the corresponding feedback signal notifies the power supply circuit 50 to decrease its output voltage to prevent excessive power dissipation by the VCRs 88.

As such, by properly controlling the voltage headroom, the power supply circuit 50 may provide sufficient drive voltage and current to drive all of the independent color channels, while reducing or minimizing excess power dissipation by the VCRs. The multi-channel light driver 30-1 controls the headroom of all channels by using only a single feedback/control loop from one dominant color channel (e.g., the green color channel), rather than several different feedback loops. This reduces the number of optocouplers that are needed and greatly simplifies the control logic of the light driver 30-1, which translates to lower overall cost and size of the system.

According to some embodiments, the channel controller determines the correlated color temperature (CCT) of the light emitted by the color channels 20-24 (i.e., the CCT setting) via a CCT signal received through a CCT terminal (e.g., a CCT input CCT+) 130, and may determine the intensity of emitted light (e.g., dimmer setting) via a dimmer signal received through a dimmer input (e.g., a dimmer terminal DIM+) 132. In some embodiments, a current source 102 at the channel controller 100 first produces a first signal (e.g., a constant current) for transmission to the CCT clamp through the CCT terminal 130. The channel controller 100 then senses the CCT signal at the CCT terminal 130. In a similar manner, the channel controller 100 may generate a current signal (e.g., a constant current) for transmission to the DIM+ line, and may sense a dimmer signal (e.g., a constant voltage) at the dimmer input 132, and thereby determine the dimmer setting.

While FIG. 1 shows the channel controller 100 having a direct connection to the CCT and dimmer inputs 103 and 132, embodiments of the present disclosure are not limited thereto. For example, to protect the channel controller 100, the CCT and dimmer inputs 103 and 132 may be electrically isolated from the channel controller via a PWM modulator and an optocoupler, which may convey the signals at these inputs to the channel controller 100 without using a direct electrical connection. In some embodiments, the light driver may further include a transceiver that wirelessly communicates with a CCT device and/or a dimmer device and receives the CCT and/or dimmer signals (e.g., the CCT and dimmer settings) from these external components.

As noted above, the light driver 30 achieves a desired color temperature (i.e., CCT) by adjusting the intensity (measured in lumens) of the light emitted by each of the color channels. Thus, the total lumen output of the light driver depends on the CCT setting.

Figure 2:
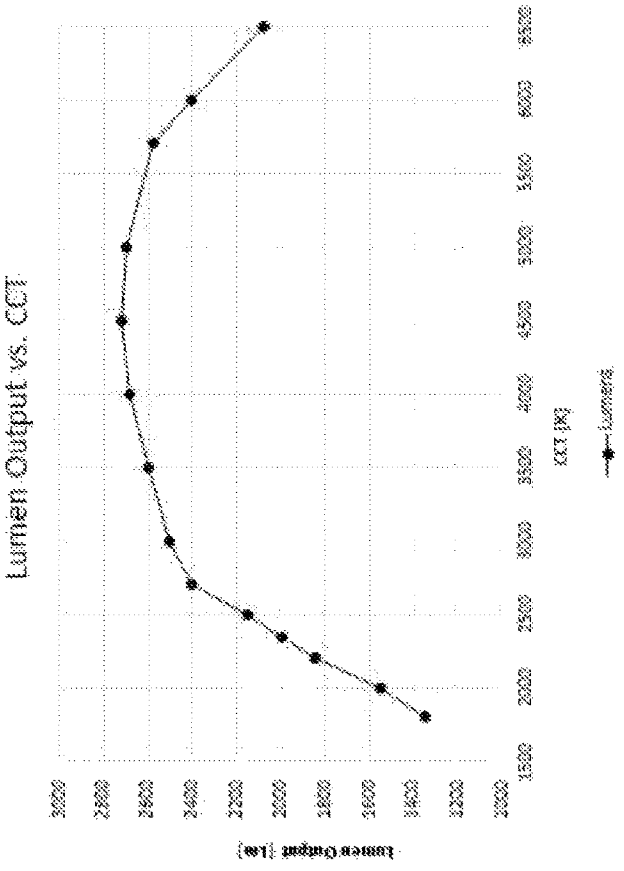
FIG. 2 illustrates a plot of the maximum lumen output of the light driver versus the color temperature (CCT) setting, according to some examples.
Figure 3:
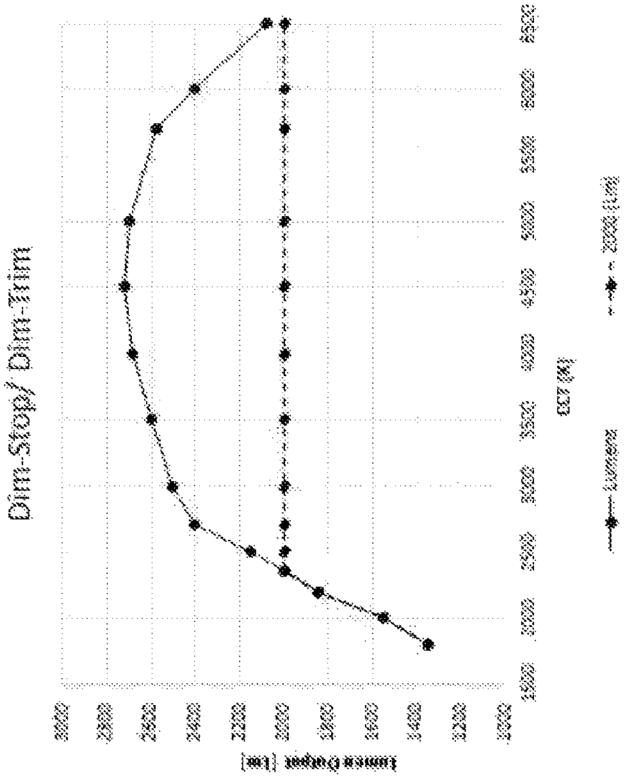
FIG. 3 illustrates the flattened output curve of the light driver when programmed with a CCT clamp, according to some embodiments of the present disclosure.

FIG. 2 illustrates a plot of the maximum lumen output of the light driver versus the color temperature (CCT) setting (in Kelvins), according to some examples. FIG. 3 illustrates the flattened output curve of the light driver 30 when programmed with a CCT clamp (at the dim-stop limit), according to some embodiments of the present disclosure.

As shown in FIG. 2, the lumen output is at its maximum when CCT is approximately 4500 K and begins to drop sharply at CCT values lower than 2700 K and greater than 5700 K, as there is insufficient light being emitted by the color channels. As an example, to achieve the red color light at low CCT values the red and green color channels provide the majority of the visible light with little to no blue light. A result of this behavior is that the overall light output of the driver's color channels will be lower at these CCT color-temperatures than at more midrange CCT values. Here, the drop in light output becomes readily noticeable near the high and low ends of CCT values, which may be undesirable in certain applications.

According to some embodiments, the light driver 30 is capable of maintaining a constant maximum lumen output across a range of CCT values based on a dim-stop limit. This essentially flattens the lumen output curve so that the driver will not pass the dim-stop limit regardless of CCT. Thus, the dim-stop limit provides the driver 30 an artificial maximum light output for a range of CCTs. An example of this may be observed in FIG. 3 where a limit of 2000 Lm is applied across a range of 2500 K to 6500 K. Since, in this example, the light driver 30 may not surpass the 2000 Lm limit within this range of CCTs, it can ensure a consistent light output within this range.

In some embodiments, the CCT clamp is a feature that may be enabled (by, e.g., setting a sim-stop limit) or disabled by a user. This provides the user the option of having a consistent light output without sacrificing dimming functionality or any other functionality of the driver.

According to some embodiments, the dim-stop level (also referred to a dim-trim level) may be set to any desired level that is between the maximum and minimum light output, which the light driver 30 can deliver.

Figure 4:
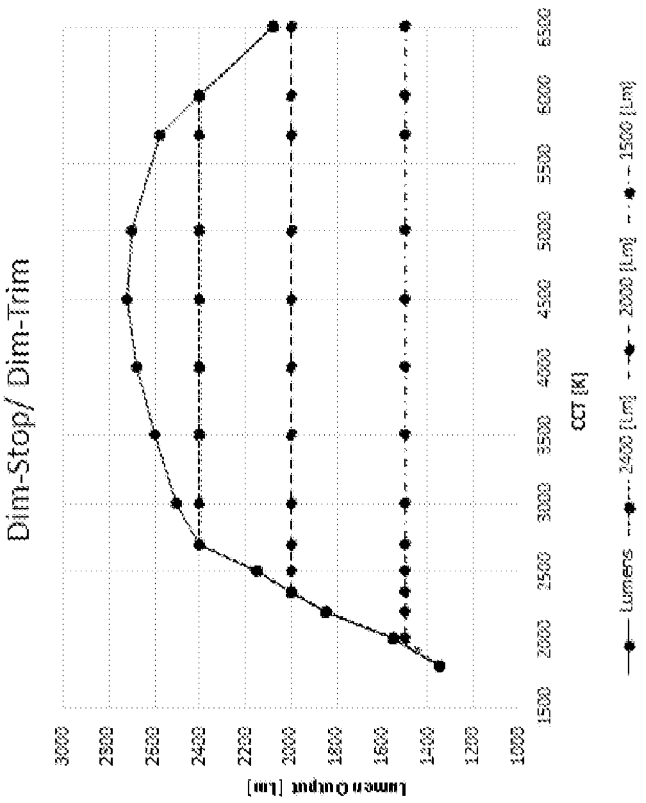
FIG. 4 illustrates the light output response of the light driver when programmed to different dim-stop levels, according to some embodiments of the present disclosure.

FIG. 4 illustrates the light output response of the light driver when programmed to different dim-stop levels, according to some embodiments of the present disclosure.

In the example of FIG. 4, at a dim-stop limit of 2000 Lm, the driver may deliver no more than 2000 Lm between 2350 K and 6500 K. Thus, at any CCT below 2350 K, the light driver 30 may operate as normal (i.e., effectively with no dim-stop limit) and have a lower lumen output since the light driver 30 cannot produce sufficient light output to reach the dim-stop limit. As shown in FIG. 4, this may be exacerbated at higher dim-stop limits and mitigated at lower limits. Higher limits will guarantee consistent light output between a narrower range of CCTs while lower limits will guarantee consistent light output between a wider range of CCTs. In this example, at a 2400 Lm dim-stop limit, the light driver ensures consistent light output between 2700 K to 6000 K, and at 1500 Lm, ensures consistent light output between 2000 K to 6500 K.

According to some embodiments, when programmed with a dim-stop limit, the programmable light driver 30 limits the lumen output of the plurality of color channels to the dim-stop limit by adjusting the channel currents to the plurality of color channels based on a dim-stop limit.

In some embodiments, the channel controller 100 receives the dim-stop limit from a programming device (e.g., a dim-stop programmer) 400 and adjusts the reference signals using calibration values (also referred to as scaling factors) to generate calibrated reference signals for transmission to the current control circuitry 80 connected to the plurality of color channels 20-24. The plurality of current control circuity 80 then adjust the channels currents driving the corresponding color channels based on the corresponding calibrated reference signals. For example, the channel generates first, second, and third calibrated reference signals for driving the color channels 20, 22, and 24, respectively. In some examples, the error amplifier 86 generates a gate control signal for controlling the state of the VCR 88 based on a difference between the corresponding calibrated reference signal and the sense signal received from the current sense circuit 84.

In determining the calibrated reference signals, the channel controller 100 may first generate the reference signals for driving the color channels 20-24 according to the dimmer setting and the CCT setting, then determine the corresponding calibration values (e.g., first, second, and third calibration values corresponding to the first, second, and third color channels 20, 22, and 24) based on the dim-stop limit and the CCT setting. The channel controller 100 may then calculate each calibrated reference signal by multiplying the corresponding reference signal and calibration value (e.g., by multiplying the first reference signal by the first calibration value, etc.).

In some embodiments, the channel controller 100 determines each calibration value by determining the maximum lumen output of the light driver at the CCT setting, and calculating each calibration value by dividing the dim-stop limit by the maximum lumen output. Thus, the calibration values for the plurality of color channels 20-14 may all be the same. However, embodiments of the present disclosure are not limited thereto, and one or more of the calibration values may be different from other ones of the calibration values. The channel controller 100 may determine the maximum lumen output of the light driver 30 based on a second look-up table (LUT) that associates CCT values with maximum lumen outputs of the light driver (i.e., maps CCT values to maximum lumen outputs). For example, the LUT may store the data points along the curve shown in FIG. 2. The LUT may be stored in a memory (e.g., a memory local to the channel controller 100). In some embodiments, the channel controller 100 uses linear interpolation to obtain a calibration value (e.g., scaling factor) for CCT levels that lie between known CCT data points. In some examples, during the development phase, the LUT may be initially populated manually by running the light driver 30 at specific CCT values and recording the total lumen output.

While in the above description, the calibration values are calculated based on the CCT level and the associated maximum lumen output, embodiments of the present invention are not limited thereto. For example, during the development phase, the calibration values (e.g., scaling factors) for each channel that achieve a desired dim-stop lumen output for a given CCT setting may be determined. This may be repeated for different CCT values and dim-stop limits, and the corresponding calibration values recorded in a LUT. During operation, the channel controller 100 may retrieve the calibration values for the color channels from this LUT based on the desired CCT setting and the dim-stop limit. Interpolation may be used to obtain calibration values for particular CCT and/or dim-stop values that fall between the recorded CCT and/or dim-stop points of the LUT.

In some embodiments, when the dim-stop feature is disabled/deactivated by a user, the channel controller 100 uses a calibration value of 1 for each color channel, thus allowing the color channels to produce the maximum lumen output (as, e.g., shown in FIG. 2) at the set CCT value for a maximum dimmer setting (e.g., a dimmer setting of 100%). As shown in FIG. 3, the dim-stop limit may correspond to the total lumen output of the plurality of color channels at a minimum CCT value or a maximum CCT value of the range of CCT values.

The light output that the light driver 30 can deliver may be affected by the type of cover or fixture that the driver 30 is placed in. Therefore, the calibration methods described above may also be performed per fixture when suitable.

According to some embodiments, when the dim-stop feature is enabled/activated, the dimming feature of the light driver 30 is preserved. For example, the light driver 30 may dim between the dim-stop limit and the minimum light output. That is, when enabled, the dim-stop limit may correspond to the maximum dimmer setting (e.g., 100%), and the minimum light output may correspond to the minimum dimmer setting (e.g., 0%).

Figure 5:
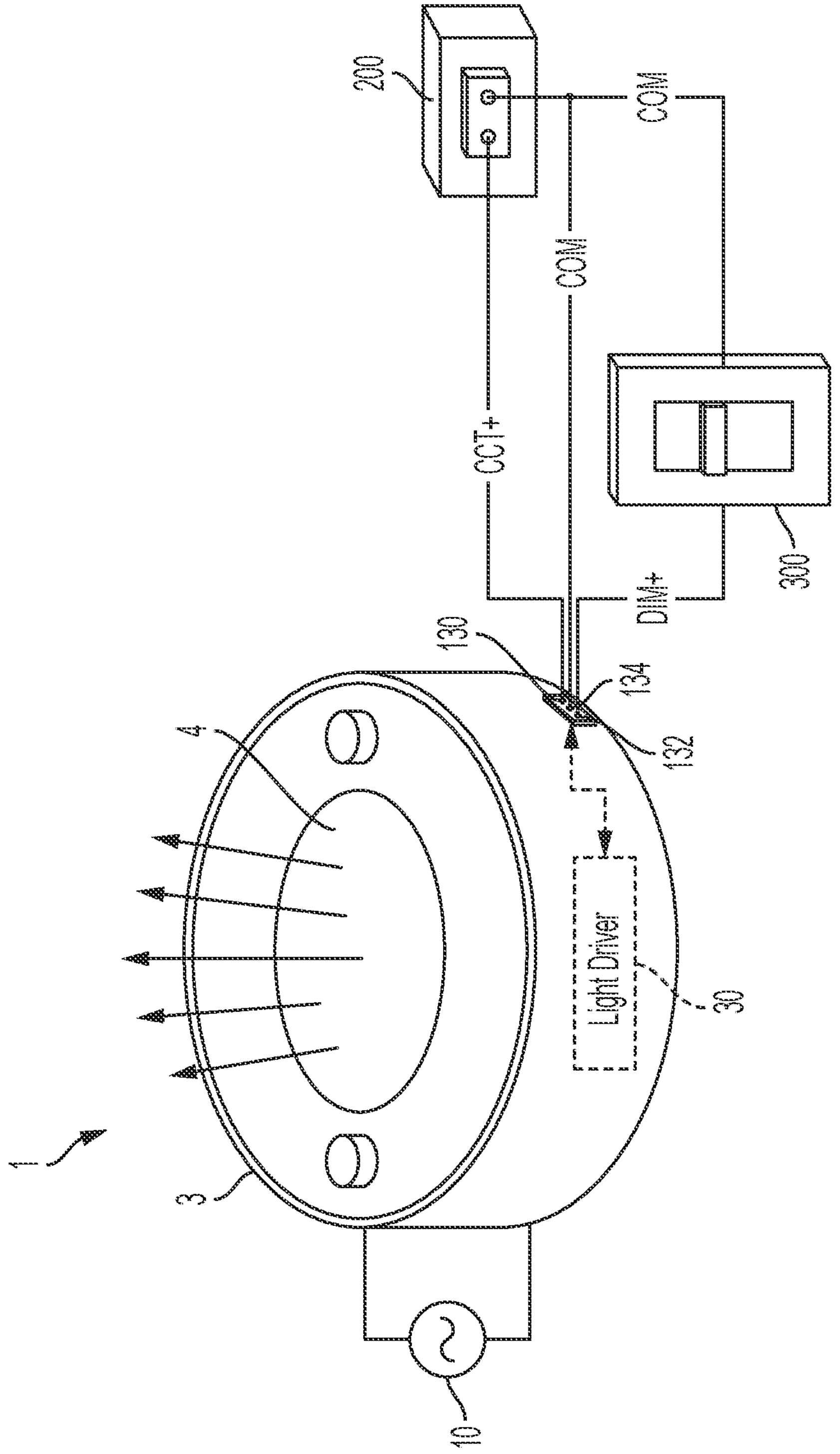
FIG. 5 illustrates the lighting system coupled to a CCT device and a dimmer device, according to some embodiments of the present disclosure.

FIG. 5 illustrates the lighting system 1 coupled to a CCT device and a dimmer device, according to some embodiments of the present disclosure.

According to some embodiments, the lighting system 1 includes the light driver 30, which is packaged within a light housing 3 having a transparent or semi-transparent portion 4 that allows light of the color channels 20-24 to shine through to the outside environment. The lighting system 1 may be coupled to a CCT device 200, which sets the CCT of the light produced by the lighting system 1. The CCT device 200 may be electrically coupled to the CCT terminal 130 and a common terminal (i.e., a ground reference) 134 of the lighting system 1.

In some embodiments, the CCT device 200 may be a CCT dimmer (e.g., a 0-10V dimmer) where the CCT dimmer level determines the CCT setting of the light driver 30. For example, the lowest CCT dimmer setting (e.g., 0%) may correspond to a minimum CCT that the light driver 30 can produce (e.g., 1800 K or 2000 K), and the highest CCT dimmer setting (e.g., 100%) may correspond to a maximum CCT that the light driver 30 can produce (e.g., 6000 K or 6500 K). According to some examples, the CCT dimmer interface may be a rocker interface, a tap interface, a slide interface, a rotary interface, or the like.

In some embodiments, the CCT device 200 may be a CCT clamp that sets the CCT setting of the light driver 30 to a particular fixed value. In some examples, the CCT clamp may be a passive device (i.e., without any independent power source) that includes only passive electronic components (such as resistor(s), diodes, etc.) and is powered by (e.g., solely powered by) the first signal output by the light driver 1 via the CCT terminal 130. The CCT clamp may include a shunt regulator that converts the first signal generated by the light driver 30, which may be variable and inaccurate, into a constant CCT signal that is accurate/precise (with very low variance). As the channel controller 100 of the light driver 30 bases the CCT of the light output on the CCT signal, the accuracy and precision of the CCT signal may allow the lighting system to consistently and precisely produce a desired color at its output.

The lighting system 1 may also be coupled to a dimmer device 300 that can set an adjustable dimmer level by transmitting a dimmer signal to the channel controller 100 via the dimmer input 132. Here, the dimmer device 300 may be electrically coupled to the dimmer input 132 and a common terminal (i.e., ground reference) 134 of the light driver 30. The dimmer signal received by the channel controller 100, which represents the dimmer setting, may variably reduce the electrical power delivered to the color channels 20, 22, and 24. In some examples, the dimmer may be a 0-10V dimmer. According to some examples, the dimmer interface may be a rocker interface, a tap interface, a slide interface, a rotary interface, or the like.

Figure 6:
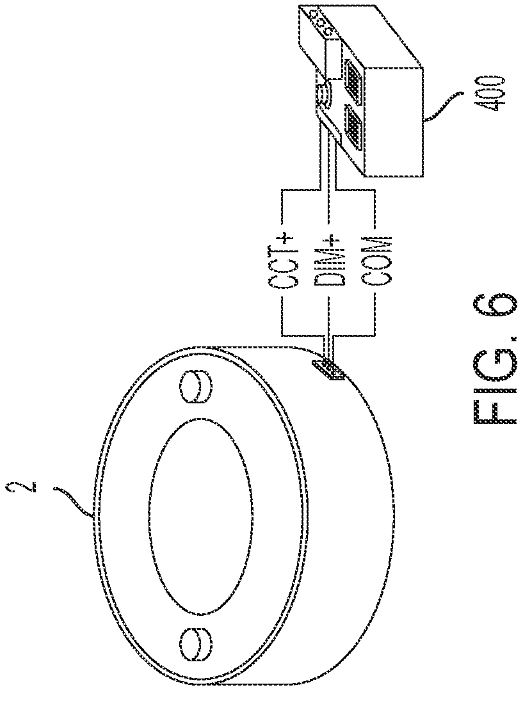
FIG. 6 illustrates the lighting system coupled to a programming device, according to some embodiments of the present disclosure.

FIG. 6 illustrates the lighting system 1 coupled to a programming device, according to some embodiments of the present disclosure.

According to some embodiments, the lighting system 1 (e.g., the light driver 30) is configured to be programmed with the dim-stop limit by a programming device 400. The programming device 400 may also activate/deactivate the dim-stop feature. In some embodiments, the programing device 400 is capable of initiating programming mode of the light driver 30 during which the dim-stop limit of the light driver 30 may be programmed into the memory of the light driver 30. The programming device 400 may also program one or more of the CCT value and the dimming level of the light driver 30 into the memory. During normal operation, the light driver 30 relies on the programmed values to set/determine the dim-stop limit as well as the CCT and/or dimming level of the output light. Once programmed, the Dim-Stop/Dim-Trim settings as well as any other settings (e.g., dimming/CCT settings) remain even through power-cycles. Once programmed, the dimming and/or CCT level of the lighting system 1 may still be adjusted using the dimming device 300 and/or CCT device 200 (as, e.g., shown in FIG. 2). For example, the light driver 30 retains dimming functionality where the maximum lumen output that the driver 30 can deliver is the new Dim-Stop limit. Further, CCT dimming is unaffected and can be dimmed as before.

In some examples, the programming device 400 may connect to and interfacing with the programmable light system 1 via wires connected to the terminals/inputs 130, 132 and 134 (i.e., CCT+, DIM+, and COM). However, embodiments of the present disclosure are not limited thereto, and the programming device 400 may connect via a separate (e.g., dedicated) terminal at the light system 1.

Figure 7:
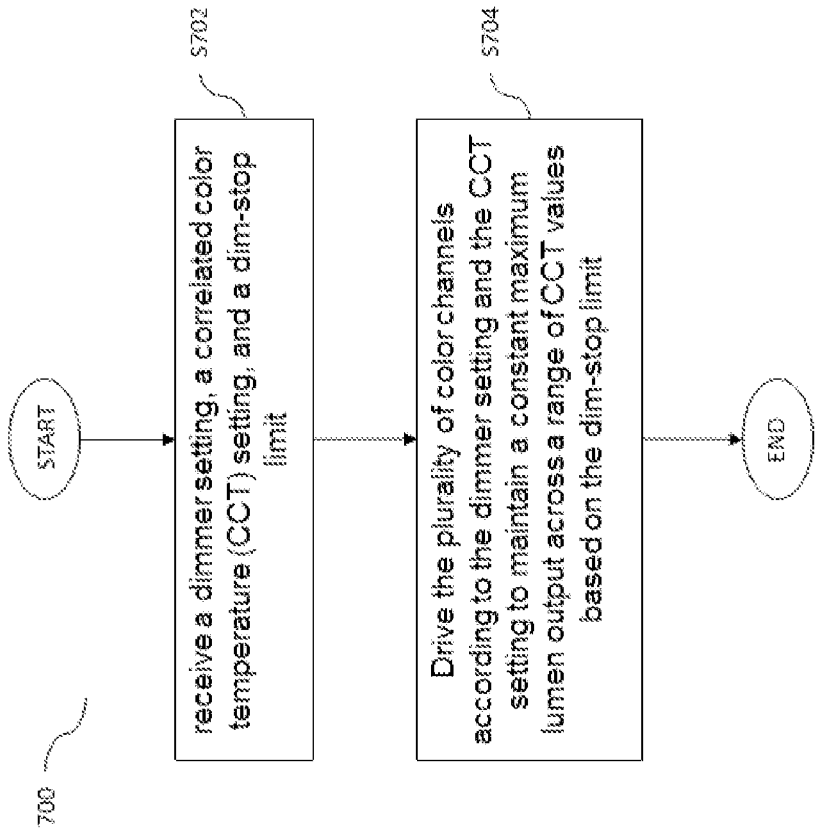
FIG. 7 illustrates a process of driving a plurality of color channels, according to some embodiments of the present disclosure.

FIG. 7 illustrates a process 700 of driving a plurality of color channels, according to some embodiments of the present disclosure.

According to some embodiments, the light driver 30 receives a dimmer setting, a correlated color temperature (CCT) setting, and a dim-stop limit (S702). The light driver 30 may receive the dimmer setting from a dimmer device 300, the CCT setting from a CCT device 200, and the dim-stop limit from a programming device 400. However, embodiments of the present disclosure are not limited thereto. For example, the programming device 400 my provide at least one of the dimmer setting and the CCT setting in addition to the dim-stop limit.

In some embodiments, the light driver 30 drives the plurality of color channels 20-24 according to the dimmer setting and the CCT setting to maintain a constant maximum lumen output across a range of CCT values based on the dim-stop limit. In so doing, the light driver 30 may generating a first calibrated reference signal based on the dimmer setting, the CCT setting, and the dim-stop limit, and adjust a first channel current driving a first color channel of the plurality of color channels 20-24 based on the first calibrated reference signal.

The light driver may generate the first calibrated reference signal by generating a first reference signal for driving the first color channel according to the dimmer setting and the CCT setting, determining a first calibration value based on the dim-stop limit and the CCT setting, and calculating the first calibrated reference signal by multiplying the first reference signal by the first calibration value.

The light driver 30 may determine the first calibration value by determining a maximum lumen output of the light driver at the CCT setting, and calculating the first calibration value by dividing the dim-stop limit by the maximum lumen output. The maximum lumen output of the light driver may be determined based on the second look-up table (LUT) that associates CCT values with maximum lumen outputs of the light driver 30.

Accordingly, as described above, the dim-stop feature of the lighting system 1, when activated, can deliver a consistent light output across a range of CCT. Despite this, dimming and CCT adjustment capabilities of the driver remain operational after activating Dim-Stop/Dim-Trim. The dim-stop feature also provides added control of thermals. Generally, when lights (e.g., LED lights) of the plurality of color channels are turned on, they produce heat, which is transferred away by an adequate heat-sink to ensure that the lights do not overheat. However, in small lighting applications, areas where a larger heatsink would not fit or areas that are devoid of airflow, it is imperative that a consistent maximum temperature is enforced to prevent overheating and to preserve the lifetime of the product. By limiting/clamping the maximum lumen output of the lighting system 1, the dim-stop feature reduces the overall heat produced by the color channels, thus allowing for safe use of the lighting system 2 in applications where heatsinks are limited in size and where there is little to no airflow. Additionally, the dim-stop feature provides consistency in light output from one lighting system to another; thus, preventing noticeable variation in lumen output during a side-by-side comparison of light fixtures.

It will be understood that, although the terms “first”, “second”, “third”, etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms “a” and “an” are intended to include the plural forms as well, unless the context clearly indicates otherwise. It will be further understood that the terms “include”, “including”, “comprises”, and/or “comprising”, when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Expressions such as “at least one of”, when preceding a list of elements, modify the entire list of elements and do not modify the individual elements of the list. Further, the use of “may” when describing embodiments of the inventive concept refers to “one or more embodiments of the inventive concept”. Also, the term “exemplary” is intended to refer to an example or illustration.

It will be understood that when an element or layer is referred to as being “on”, “connected to”, “coupled to”, or “adjacent” another element or layer, it can be directly on, connected to, coupled to, or adjacent the other element or layer, or one or more intervening elements or layers may be present. When an element or layer is referred to as being “directly on,” “directly connected to”, “directly coupled to”, or “immediately adjacent” another element or layer, there are no intervening elements or layers present.

As used herein, the terms “use”, “using”, and “used” may be considered synonymous with the terms “utilize”, “utilizing”, and “utilized”, respectively.

The light driver and/or any other relevant devices or components according to embodiments of the present invention described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the light driver may be implemented on a flexible printed circuit film, a tape carrier package (TCP), a printed circuit board (PCB), or formed on the same substrate. Further, the various components of the light driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A programmable lighting system comprising:

a plurality of color channels configured to generate light of different colors; and a light driver configured to drive the plurality of color channels according to a dimmer setting and a correlated color temperature (CCT) setting, and to maintain a constant maximum lumen output across a range of CCT values based on a dim-stop limit, the light driver comprising:

a first current control circuit coupled to a first color channel of the plurality of color channels and configured to adjust a first channel current driving the first color channel based on a first calibrated reference signal; and a channel controller configured to perform:

generating a first reference signal for driving the first color channel according to the dimmer setting and the CCT setting;

determining a first calibration value based on the dim-stop limit and the CCT setting; and calculating the first calibrated reference signal by multiplying the first reference signal by the first calibration value.

2. The programmable lighting system of claim 1, wherein the light driver is configured to adjust channel currents to the plurality of color channels to limit a lumen output of the plurality of color channels to the dim-stop limit.

3. The programmable lighting system of claim 1, wherein the determining the first calibration value comprises:

determining a maximum lumen output of the light driver at the CCT setting; and calculating the first calibration value by dividing the dim-stop limit by the maximum lumen output.

4. The programmable lighting system of claim 3, wherein the determining the maximum lumen output of the light driver is based on a look-up table (LUT) associating CCT values with maximum lumen outputs of the light driver.

5. The programmable lighting system of claim 1, wherein the first current control circuit comprises:

a current sensor configured to sense the first channel current of the first color channel and to generate a first sense signal;

an error amplifier configured to receive the first sense signal and the first calibrated reference signal, and to generate a gate control signal based on a difference between the first calibrated reference signal and the first sense signal; and a voltage-controlled resistor (VCR) configured to adjust the first channel current by dynamically adjusting a resistance of the VCR based on the gate control signal.

6. The programmable lighting system of claim 5, wherein the current sensor comprises:

a sense resistor electrically coupled in series with the VCR and the first color channel; and a current sense circuit configured to generate the first sense signal based on a voltage drop across the sense resistor.

7. The programmable lighting system of claim 1, wherein the light driver further comprises:

a power supply circuit configured to generate a drive signal for powering the plurality of color channels based on an input power signal, wherein the first current control circuit is configured to adjust the first channel current of the first color channel further based on the drive signal.

8. The programmable lighting system of claim 7, wherein the light driver comprises:

a rectifier circuit configured to rectify the input power signal to generate a rectified signal having a single polarity, wherein the power supply circuit is configured to generate the drive signal based on the rectified signal.

9. The programmable lighting system of claim 1, wherein the plurality of color channels comprises:

the first color channel comprising one or more green LEDs;

a second color channel comprising one or more blue LEDs; and a third color channel comprising one or more red LEDs.

10. The programmable lighting system of claim 1, wherein the dim-stop limit corresponds to a lumen output of the plurality of color channels at a minimum CCT value or a maximum CCT value of the range of CCT values.

11. The programmable lighting system of claim 1, wherein the light driver is configured to be programmed with the dim-stop limit from a programming device, and wherein the light driver is configured to receive the dimmer setting from a dimming device.

12. A programmable lighting system comprising:

a plurality of color channels configured to generate light of different colors; and a light driver configured to drive the plurality of color channels according to a dimmer setting and a correlated color temperature (CCT) setting, and to maintain a constant maximum lumen output across a range of CCT values based on a dim-stop limit, the light driver comprising:

a first current control circuit coupled to a first color channel of the plurality of color channels and configured to adjust a first channel current driving the first color channel based on a first calibrated reference signal;

a second current control circuit coupled to a second color channel of the plurality of color channels and configured to adjust a second channel current driving the second color channel based on a second calibrated reference signal;

a third current control circuit coupled to a third color channel of the plurality of color channels and configured to adjust a third channel current driving the third color channel based on a third calibrated reference signal; and a channel controller configured to generate the first, second, and third calibrated reference signals based on the dimmer setting, the CCT setting, and the dim-stop limit.

13. A programmable lighting system comprising:

a plurality of color channels configured to generate light of different colors; and a light driver configured to drive the plurality of color channels according to a dimmer setting and a correlated color temperature (CCT) setting, and to maintain a constant maximum lumen output across a range of CCT values based on a dim-stop limit, the light driver comprising:

a first current control circuit coupled to a first color channel of the plurality of color channels and configured to adjust a first channel current driving the first color channel based on a first calibrated reference signal;

a channel controller configured to generate the first calibrated reference signal based on the dimmer setting, the CCT setting, and the dim-stop limit; and a power supply circuit configured to generate a drive signal for powering the plurality of color channels based on an input power signal, the power supply circuit comprising:

a voltage regulator; and a transformer having a primary winding coupled to the voltage regulator and a secondary winding electrically isolated from the primary winding and coupled to the first current control circuit, wherein the first current control circuit is configured to adjust the first channel current of the first color channel further based on the drive signal.

14. A method of driving a plurality of color channels, the method comprising:

receiving, by a light driver, a dimmer setting, a correlated color temperature (CCT) setting, and a dim-stop limit; and driving, by the light driver, the plurality of color channels according to the dimmer setting and the CCT setting to maintain a constant maximum lumen output across a range of CCT values based on the dim-stop limit, wherein the driving the plurality of color channels comprises:

generating a first reference signal for driving a first color channel according to the dimmer setting and the CCT setting;

determining a first calibration value based on the dim-stop limit and the CCT setting; and calculating a first calibrated reference signal by multiplying the first reference signal by the first calibration value; and adjusting a first channel current driving the first color channel of the plurality of color channels based on the first calibrated reference signal.

15. The method of claim 14, wherein the determining the first calibration value comprises:

determining a maximum lumen output of the light driver at the CCT setting; and calculating the first calibration value by dividing the dim-stop limit by the maximum lumen output.

16. The method of claim 15, wherein the determining the maximum lumen output of the light driver is based on a look-up table (LUT) associating CCT values with maximum lumen outputs of the light driver.

* * * * *